July 14, 1959
W. G. RAWLINGS
2,894,337
SLIDE RULE TYPE OF EDUCATIONAL DEVICE
Filed Aug. 11, 1958
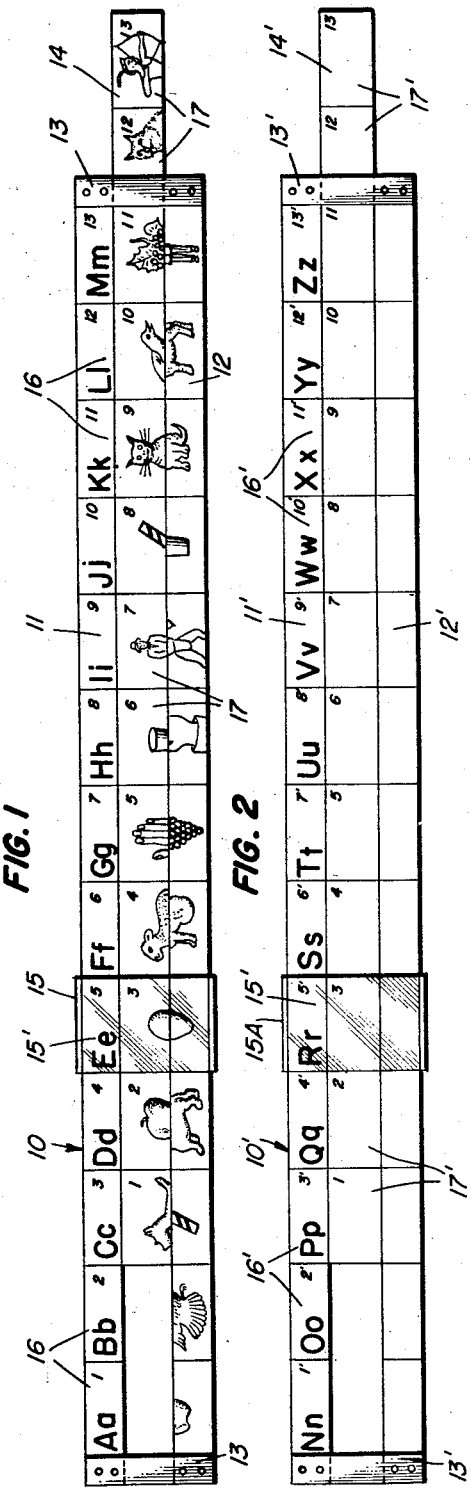
| STATION | MOVE | WORDS | | WORDS |
|---|---|---|---|---|
| 1 | 2 | apple | — | nut |
| 2 | 10 | bird | — | owl |
| 3 | 8 | candy | — | pear |
| 4 | 1 | dog | — | queen |
| 5 | 3 | egg | — | robin |
| 6 | 12 | fox | — | son |
| 7 | 11 | grapes | — | table |
| 8 | 5 | hand | — | unicorn |
| 9 | 13 | Indian | — | vase |
| 10 | 6 | jelly | — | wagon |
| 11 | 9 | kitten | — | xylophone |
| 12 | 4 | lamb | — | yo yo |
| 13 | 7 | man | — | zebra |
INVENTOR
*Wallace Gillian Rawlings*
BY
ATTORNEY

United States Patent Office 2,894,337
Patented July 14, 1959

2,894,337
SLIDE RULE TYPE OF EDUCATIONAL DEVICE

Wallace G. Rawlings, Waverley, Va., assignor of sixteen and one-third to Charlie C. Rawlings, Sr., sixteen and one-third to Charlie C. Rawlings, Jr., both of Waverley, Va., and sixteen and one-third to Kenneth L. Rawlings, Pearisburg, Va.

Application August 11, 1958, Serial No. 754,365

5 Claims. (Cl. 35—75)

My invention relates generally to the field of educational devices for young children, and more specifically is directed to and concerned with the production of an instrumentality for conveniently and quickly familiarizing young people, both with the alphabet and the physical operation of generally slide rule type of instruments.

An object of my invention is to produce an educational device which, bearing close physical resemblance to the conventional elongated slide rule, in simple and direct manner permits the ready instruction of young people in the alphabet, and this in pleasing, entertaining and agreeable mode, and which device itself is simple and inexpensive of construction, certain in operation, durable and of long useful life, being low in cost both of production and in subsequent maintenance.

Other objects and advantages in part will be obvious and in part more fully pointed out hereinafter, during the course of the following description, particularly when taken in the light of the accompanying drawings.

My invention, accordingly, may be seen to reside in the several parts, elements, and features of construction, in the assembly and relationship of each of the same with respect to one or more of the others and, as well, in the relation of the various letter stations on the instrumentality with the complementary pictorial representations provided thereon, the scope of the application of all of which is more fully set forth in the claims at the end of this specification.

Other objects and advantages will in part be obvious and in part more fully pointed out hereinafter, during the course of the following description, particularly when considered in the light of the disclosure of the accompanying drawings.

In the several views of the drawings, wherein I have disclosed that embodiment of my invention to which I prefer at present;

Figure 1 discloses the first or front face of a slide rule typ of educational device according to the practice of my invention;

Figure 2 in generally similar manner, discloses the second or reverse face of a device of the same general type; while Figure 3 comprises a chart which discloses the correct mode of manipulation of the device according to the first or front face thereof, i.e., according to the disclosure of Figure 1.

Throughout the several views of the drawings like reference characters denote like structural parts.

To permit a more ready and thorough understanding of my invention it may be noted at this point in the disclosure that an important deficiency in modern teaching techniques as applied to young children is unfamiliarity with the alphabet, coupled with consequent and subsequent lack of facility in employing this highly useful tool in word formation and in the practice of its manifold skills. Postulating simplicity in the mode and instrumentalities employed in teaching the alphabet, it is apparent that high importance attaches to this phase of the teaching art.

In broadly parallel manner increasing importance, accelerating in nature, is being attached to basic familiarity and hence enjoyment with matters generally technical in nature, and this at an early age in educating and raising the child. For it is recognized that such familiarity imparted at an early date, will permit the young student to progress rapidly in his education, without necessity of deviation from substantive approach to the more objective requirement of preliminary mastery of the essential tools. All the foregoing has been dramatically highlighted by the comparatively recent agitation towards more technical and intensive education of young people, largely as a direct result of the technological competition which has arisen between the two great world powers.

Hence, a mastery of the alphabet combined with an introduction to the use of a slide rule type of instrument is highly advantageous, provided only this can be accomplished in direct, simple, pleasing and inexpensive manner.

A substantial contribution to the foregoing objectives is presented by the practice of my invention.

And now, having more particular reference to the several views of the drawings, it is to be noted that my new device has the general configuration of the well-known elongated slide rule of conventional type. Preferably but not necessarily, this configuration is that of the more complex type of slide rule, wherein both first and second faces thereof, that is, both the front and back faces thereof are employed, rather than utility being confined to a single face, as in the conventional Mannheim type of rule. In my preferred construction, therefore, the body is of open frame construction, having front and back, first and second faces thereon, and being divided into upper and lower rails, connected at their ends by posts. I provide a slide movable in tracks formed in the interior and adjacent faces of said rails and movable through the hollow posts. Finally and typically I provide the customary indicator.

With the foregoing in mind it will be seen that the elongated body, indicated generally at 10, is comprised of first or upper rail 11 and second or lower rail 12. These rails 11 and 12 are joined at their ends by hollow posts, indicated generally at 13, 13, of conventional design. Elongated slide 14 fits snugly within tracks, conventional in nature, provided on the inner and related, longitudinally extending ends or faces of the first and second rails 11, 12. The slide 14 passes through the hollow end posts 13, 13 without resistance or impedance. A conventional indicator 15 is provided fitting snugly over, and being restrained to longitudinal engagement therealong, by rails 11, 12. Indicator 15 contains the usual glass window 15', 15'.

Physically, and as described to this point in the disclosure, my new device responds closely to the construction of the conventional slide rule. This is a point of considerable advantage in that in the use of the device, not only is the young student familiarized with the alphabet in the manner hereinafter more fully pointed out, but at the same time he becomes somewhat acquainted with the general construction and relationship of the parts of the conventional and ordinary slide rule, such as is useful and commonplace in technical education.

Transversely of its length the elongated body 10 is divided into a number of stations 16. Preferably, although not absolutely necessarily, these stations are of equal width as viewed longitudinally of body 10. Again and preferably but not necessarily, the number of stations 16 along each face of the body is thirteen in number. Both the first and second rails 11, 12 of body 10 are thus divided into stations 16. It is to be noted from closer consideration of Figure 1, that each such station 16 is sequentially numbered by smaller numbers ranging from (1) through (13), respectively.

On a selected rail 11 or 12, say the upper rail 11, the letters of the alphabet are sequentially provided. Thus, in station (1) is provided the letter "A," in station (2) is provided the letter "B," in station (3) the letter "C," and so on through station (13), wherein is provided the letter "M." Preferably but not necessarily, both the particular upper and lower case letter of the alphabet are provided in each station 16. This amply familiarizes the student with both the capital and lower case letters. While the upper rail 11 has been shown as that rail on which is provided the letters of the alphabet, it is of course apparent that the lower rail 12 may be the rail on which the letters of the alphabet are provided. This is a matter of choice.

On the other rail, here the lower rail 12, I provide in each station 16 a part of a typical and conventional object. These objects are selected to present dramatically to the student the significance of the particular letter of the alphabet which is provided in the corresponding station 16 on the first rail 11 of the particular face of the body 10 which is undergoing discussion.

In generally like manner the slide 14, on each face thereof, is transversely divided along its length into an equal number of stations 17. In these stations 17 on the slide 14, which in manner akin to the treatment of stations 16 on body 10, are numbered with small numbers from (1) through (13) consecutively, are provided the complementary and remaining part of each such object.

In the use of my device, it is the object of the student to match a particular station 17 on the slide with the corresponding station 16 on the stator or body 10, thus completing the depiction of an object, and calling attention to the corresponding letter of the alphabet in the chart in Fig. 3. It will be seen for example, that station (3) on the slide 14 is to be matched with the station (5) on the body 10. When this is done, then the indicator 15 is moved into position for the completed picture, thereby dramatically outlining and framing the same. It will be seen that the depiction of an egg has been completed, and that in the corresponding station (5) on the upper rail 11 of the alphabet which corresponds to the first letter of the conventional name of the object depicted, namely "E" is illustrated.

Thus the young student, through slide rule-like manipulation of my new educational device, is enabled to associate the depiction of an egg with that letter of the alphabet which corresponds to the first letter of the conventional name thereof. Thus he quickly familiarizes himself, not only with these conventional and typical items so frequently encountered in ordinary life, but with the alphabet itself. All this takes place in entertaining and pleasure-giving manner.

Of course in the ordinary use of the device it is intended that the child will not initially refer to the chart in Figure 3, but will move the slide 14 along the body to match the stations (1) through (13) on the slide 14 with those on the body 10, illustratively, the station (5) on the slide 14 against station (8) on the body 10. This will complete the depiction of a human hand, and will call attention to the letter "H" on the upper rail 11 at station (8) thereon. And so with station (10) on slide 14 which, matched with station (2) on body 10, completes the depiction of a bird, with the corresponding letters "Bb" of the alphabet on rail 11. The student quickly learns to produce the complete picture. Having learned the name of that particular object thus illustrated, he associates the corresponding letter of the alphabet with the first letter of the ordinary name of that object.

Having more particular reference to the disclosure of Figure 2, wherein is pictured the reverse face of my new device, it will be seen that the suffix prime (') is provided after each reference character for the parts of this second or reverse face of the device, each corresponding to the generally similar part as shown on the first or front face thereof, as in Figure 1. Thus the elongated body 10' has an upper rail 11' and a lower rail 12', joined together at their ends by hollow posts 13', 13'. The elongated slide 14' slides through those rails 11' and 12'. Indicator 15A slides between those rails.

Here again, the elongated body 10' is divided transversely into thirteen stations of equal width, corresponding sequentially to the second or last thirteen letters of the alphabet, beginning with "N" and ending with "Z." These stations are indicated generally by small numbers (1) through (13), sequentially. Similarly, slide 14' is divided into thirteen stations of equal width. And adopting the same convention as employed with the disclosure on the first or front face of the part of the device as shown in Figure 1, the upper rail 11' contains the letters of the alphabet in the several stations thereof, while the lower rail 12' has a portion of that object, the first letter of the usual name for which is identical with the corresponding letter of the alphabet provided in the upper portion of the particular station, in rail 11'.

For simplicity, the particular objects are not shown in Figure 2.

It is apparent from the foregoing that my new educational device is simple of production. Sturdy, substantially foolproof, and of long useful life, it can be produced at minimum cost of manufacture. In manner giving wide variety of pleasing and continuously changing, preferably color variation, it quickly enables the youthful student to match partial designs against partial designs to complete a recognizable entity encountered in ordinary life, and to associate with it not only its usual name (which is thereupon divulged from an inspection of the chart according to Figure 3) but as well, and from the respective upper rail 11 and 11', as the case may be, the significant character of the alphabet which corresponds to the first letter of the ordinary name as ascertained from the chart of Figure 3. In this manner, and as has been pointed out heretofore, not only is the student familiarized in rapid manner with many objects encountered in everyday experience, but as well, not only with the alphabet, but with basic use of the conventional slide rule, thus contributing importantly to his preliminary technical education.

While I have disclosed the use of a double-faced slide device, thirteen letters of the alphabet being on one side thereof and the remaining thirteen letters of the alphabet being on the opposite side thereof, it is of course apparent however, that I can employ the ordinary, generally Mannheim type of slide rule device, having but a single face. In this case two such slide rules would be employed to complete the alphabet. Or the rule itself may be elongated, within the spirit of my invention, and twenty-six stations provided on the same face of the device. However, from a practical standpoint, and particularly for the beginner, I prefer the shorter slide rule, having thirteen stations to a side.

All the foregoing, as well as many other highly practical advantages attend the practice of my invention.

It is apparent from the foregoing that once the broad aspects of my invention are disclosed, many embodiments thereof will readily occur to those skilled in the art, and that as well, and with equal readiness, many modifications of the disclosed embodiment will suggest themselves, all falling within the spirit of my invention. Accordingly, I intend the foregoing disclosure to be considered as purely illustrative, and not as comprising limitations.

I claim:

1. An educational device comprising in combination, an elongated body having first and second rails spaced apart along their lengths; a complemental slide received within and between the rails of said body for guided linear reciprocation between said rails; both said body and said slide being transversely marked off into a plurality of stations, the number of which stations corresponds to the number of letters in the alphabet; each said station on said body comprising, on a first rail thereof, the partial depiction of a familiar object; and the second rail of said body, within said station, containing the letter of the alphabet which corresponds to the first letter of the common name for the object which is partially depicted in said station; and the corresponding station of said slide containing, in random continuity, the complemental portion of the object already partially depicted in the corresponding station of said body; whereby upon matching a particular station of the slide with a corresponding station of the body, depiction of a completed object will be obtained, together with the corresponding letter of the alphabet comprising the first letter of the common name for said object.

2. An educational device comprising in combination, an elongated body having first and second rails spaced apart along their lengths; a complemental slide received within and between the rails of said body for guided linear reciprocation between said rails; both said body and said slide being transversely marked off into a plurality of stations, the number of which stations corresponds to the number of letters in the alphabet; each said station on said body comprising, on a first rail thereof, the partial depiction of a familiar object; and the second rail of said body, within said station, containing the letter of the alphabet which corresponds to the first letter of the common name for the object which is partially depicted in said station; the said letter of the alphabet being depicted both in upper case and in lower case.

3. An educational device comprising in combination, an elongated body having first and second rails spaced apart along their lengths; a complemental slide received within and between the rails of said body for guided linear reciprocation between said rails; both said body and said slide being transversely marked off into a plurality of stations, the number of which stations corresponds to the number of letters in the alphabet; each said station on said body comprising, on a first rail thereof, the partial depiction of a familiar object; and the second rail of said body, within said station, containing the letter of the alphabet which corresponds to the first letter of the common name for the object which is partially depicted in said station; and the corresponding station of said slide containing, in random continuity, the complemental portion of the object already partially depicted in the corresponding station of said body; whereby matching a particular station of the slide with a corresponding station of the body, depiction of a completed object will be obtained, together with the corresponding letter of the alphabet comprising the first letter of the common name for said object; and an indicator slidable along said body, for framing the particular station for which the slide has been matched with the body.

4. An alphabet-teaching device of the elongated and double-faced slide rule type and comprising an open-back body, having first and second faces disposed back to back, a complementary slide having first and second faces disposed back to back, and which correspond respectively to the first and second faces of said body; said body comprising first and second, longitudinally-extending rails joined together at their ends in spaced relation, for receiving the slide therebetween for relative longitudinal movement along said body; the first faces of both said body and said slide containing data directed to the first half of the alphabet, and the second faces thereof containing generally similar data, but directed to the second half of the alphabet; the first and second faces of the body and slide being transversely divided into thirteen stations, the stations on a first rail of each face of the body containing the letters of the alphabet in proper sequence, and the stations on a second rail of each face containing part of the representation of an object, the first letter of the common and customary name for which object corresponds to the letter of the alphabet on the first rail, and the remaining and complemental part of the representation of said object being contained in a corresponding station on said slide, whereby, upon manipulation of the slide, the complemental parts can be matched to provide the complete depiction of a selected object together with the related and corresponding letter of the alphabet comprising the first letter of the common name for said object.

5. An educational device for selectively matching depictions of common objects with written indicia thereof, comprising, in combination, an elongated body having first and second rails spaced apart along their lengths; a complemental slide received within and between the rails of said body for guided linear reciprocation between said rails; both said body and said slide being transversely marked off into a plurality of stations, each said station on said body comprising, on a first rail thereof, the partial depiction of a familiar object, and the second rail of said body, within said station, containing a written memorial which corresponds to the common designation of the object which is partially depicted in said station; and the corresponding station of said slide containing, in random continuity, the complemental portion of the object already partially depicted in the corresponding station of said body; whereby upon matching a particular station of the slide with a corresponding station of the body, depiction of a completed object will be obtained, together with a written memorial, indicative of the common designation of said object.

References Cited in the file of this patent

UNITED STATES PATENTS

| | | |
|---|---|---|
| 1,224,742 | Hillyer | May 1, 1917 |
| 1,538,530 | Troidl | May 19, 1925 |
| 1,905,381 | Griffin | Apr. 25, 1933 |
| 2,213,411 | Rippon | Sept. 3, 1940 |